US012710024B2

(12) United States Patent
Dudar et al.

(10) Patent No.: US 12,710,024 B2
(45) Date of Patent: Aug. 18, 2026

(54) METHOD AND SYSTEM FOR DIAGNOSING EVAPORATIVE EMISSIONS CONTROL SYSTEM

(71) Applicant: Ford Global Technologies, LLC, Dearborn, MI (US)

(72) Inventors: Aed Dudar, Canton, MI (US); Scott Bohr, Novi, MI (US); Sangbum Hong, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/883,854

(22) Filed: Sep. 12, 2024

(65) Prior Publication Data

US 2026/0071598 A1 Mar. 12, 2026

(51) Int. Cl.
*F02M 25/08* (2006.01)

(52) U.S. Cl.
CPC .... *F02M 25/0809* (2013.01); *F02M 25/0836* (2013.01)

(58) Field of Classification Search
CPC ............ F02M 25/0836; F02M 25/089; F02M 25/0872; F02M 25/0809; F02M 2025/0845; F02M 2200/247; F02D 41/0032
See application file for complete search history.

(56) References Cited

U.S. PATENT DOCUMENTS

| | | | | |
|---|---|---|---|---|
| 9,957,924 | B2 * | 5/2018 | Dudar | F02M 25/0809 |
| 10,054,070 | B2 * | 8/2018 | Dudar | F02D 41/0037 |
| 10,378,486 | B2 * | 8/2019 | Dudar | F02M 25/0809 |
| 11,168,648 | B2 * | 11/2021 | Dudar | F02M 25/089 |
| 11,466,631 | B2 | 10/2022 | Viola et al. | |
| 11,493,001 | B1 | 11/2022 | Dudar et al. | |
| 11,585,298 | B1 | 2/2023 | Dudar et al. | |
| 11,719,198 | B1 | 8/2023 | Dudar et al. | |
| 11,964,554 | B2 | 4/2024 | Dudar et al. | |
| 2012/0152210 | A1 * | 6/2012 | Reddy | F02M 25/089 137/15.01 |
| 2017/0350351 | A1 * | 12/2017 | Lucka | F04B 53/14 |
| 2023/0228235 | A1 * | 7/2023 | Dudar | F02M 25/0818 123/519 |

OTHER PUBLICATIONS

Dudar, A., "Method and Systems for Fuel System," U.S. Appl. No. 18/403,101, filed Jan. 3, 2024, 46 pages.

* cited by examiner

*Primary Examiner* — Grant Moubry
*Assistant Examiner* — James G Morbry
(74) *Attorney, Agent, or Firm* — McCoy Russell LLP

(57) ABSTRACT

Methods and systems are presented for diagnosing operation of an evaporative emissions system that included two carbon filled fuel vapor storage canisters that are arranged in parallel. In one example, operation of a first canister vent valve, a second canister vent valve, and a canister purge valve are adjusted to diagnose breaches and obstructions within the evaporative emissions system.

5 Claims, 11 Drawing Sheets

900

904

902

| Phase | Delta pressure | Degradation mode |
|---|---|---|
| 0 | dP0≈0 | Stuck closed CPV |
| 1 | dP1 < -6 InH2O | Stuck closed CVV1/Plugged vent/Load line 1 |
| 2 | dP1 < -0.5 AND dP2 > 0.25 InH2O | Stuck open CVV1 |
| 2 | dP1 > -1.25 AND dP2 < -0.25 InH2O | Stuck open CVV2 |
| 2 | dP2 > -6 InH2O | Stuck closed CVV2/plugged vent/Load line 2 |
| 3 | dP3 < -6 InH2O | No degradation |
| 3 | -3 InH2O > dP3 > -6 InH2O | Breach |

FIG. 9

METHOD AND SYSTEM FOR DIAGNOSING EVAPORATIVE EMISSIONS CONTROL SYSTEM

FIELD

The present description relates generally to methods and systems for evaluating operation of carbon filled fuel vapor storage canisters that are arranged in parallel.

BACKGROUND/SUMMARY

Many heavy duty vehicles heretofore have relied upon off-board fuel vapor recovery systems to capture fuel vapors that may result from filling the vehicle's fuel tank. However, even heavy duty vehicles are migrating toward on-board fuel vapory recovery systems. The heavy duty vehicles may include large fuel tanks to store fuel in so that they may operate at high loads for long trips. The volume of the large fuel tank may contribute to a large amount of fuel vapor being generated when the vehicle's fuel tank is being filled. In order to ensure that the large amount of fuel vapor that is generated during fuel tank filling and other conditions is not released to atmosphere, several carbon filled fuel vapor storage canisters arranged in parallel may be selectively coupled to the heavy duty vehicle's fuel tank. Arranging the carbon filled fuel vapor storage canisters in parallel allows carbon canisters that are already in production to capture fuel vapors in systems where larger amounts of fuel vapors may be generated. This may reduce system resources while permitting emissions standards to be achieved. Even so, arranging carbon filled fuel vapor storage canisters in parallel presents other challenges. In particular, arranging carbon filled fuel vapor storage canisters in parallel presents new challenges to ensure that breaches or blockages of hoses or conduits connecting the parallel canisters together and to the fuel vapor control system may be detected.

The inventors herein have recognized the above-mentioned issue and have developed a method for operating an evaporative emissions system of a vehicle, comprising: operating a canister purge valve and two canister vent valves that are arranged in parallel during a diagnostic sequence to diagnose the two canister vent valves and two canister vent lines that couple the two canister vent valves; and generating an indication of evaporative emissions degradation in response to output of a pressure sensor generated during the sequence.

By operating two canister vent valves and a canister purge valve, it may be possible to diagnose the presence or absence of degraded components with an evaporative emissions system that includes carbon filled fuel vapor storage canisters that are arranged in parallel. In particular, commanding the valves to different open/closed combinations allows individual valves and conduits or passages to be evaluated for breaches and/or stuck or blocked conditions even though similar system components may be arranged in parallel.

The present description may provide several advantages. In particular, the approach may provide an opportunity to diagnose evaporative emissions system components that are arranged in parallel. Additionally, the approach allows detection of valves that that may become stuck and detection of blocked passages that may permit fluidic communication between the various components of the evaporative emissions system. Further, the approach may allow individual evaporative system components to be evaluated for degradation.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 shows a table that identifies potential degradation modes for an evaporative emissions system that includes parallel coupled carbon filled fuel vapor storage canisters.

DETAILED DESCRIPTION

Figure 1:
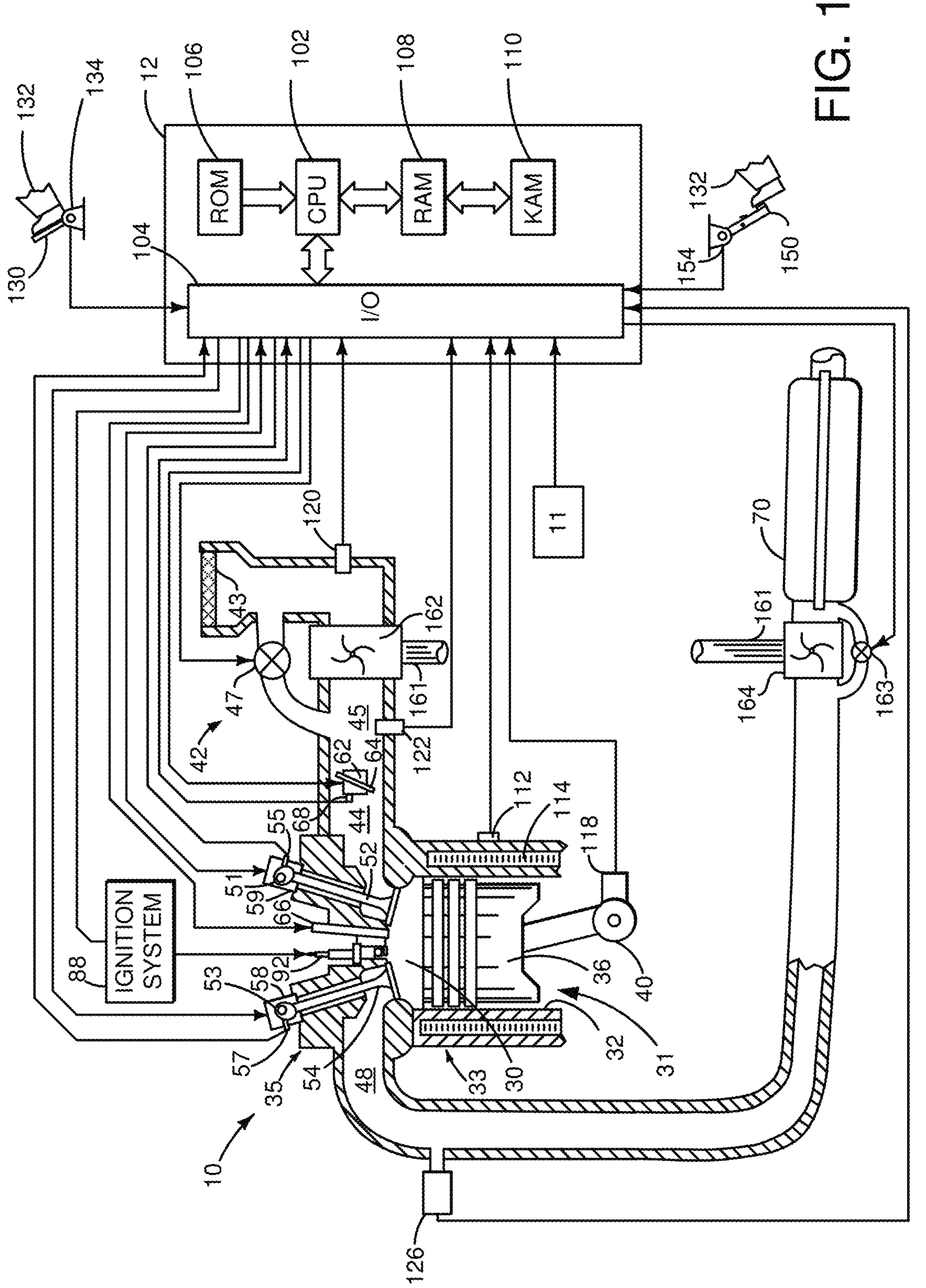
FIG. 1 shows an example engine to which an evaporative emissions system may be coupled.
Figure 2:
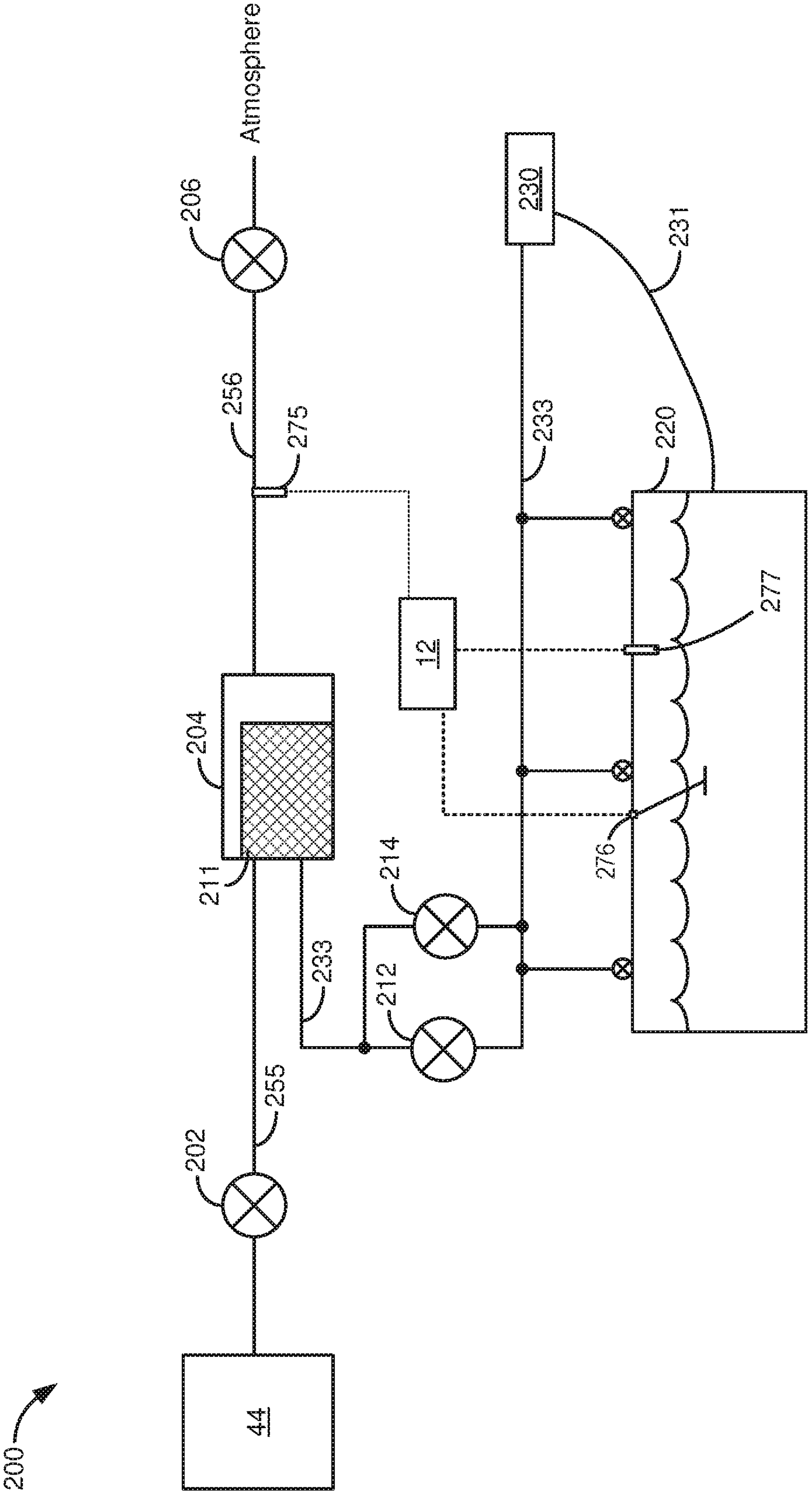
PRIOR ART FIG. 2
FIG. 2 shows an example known evaporative emissions system.
Figure 3:
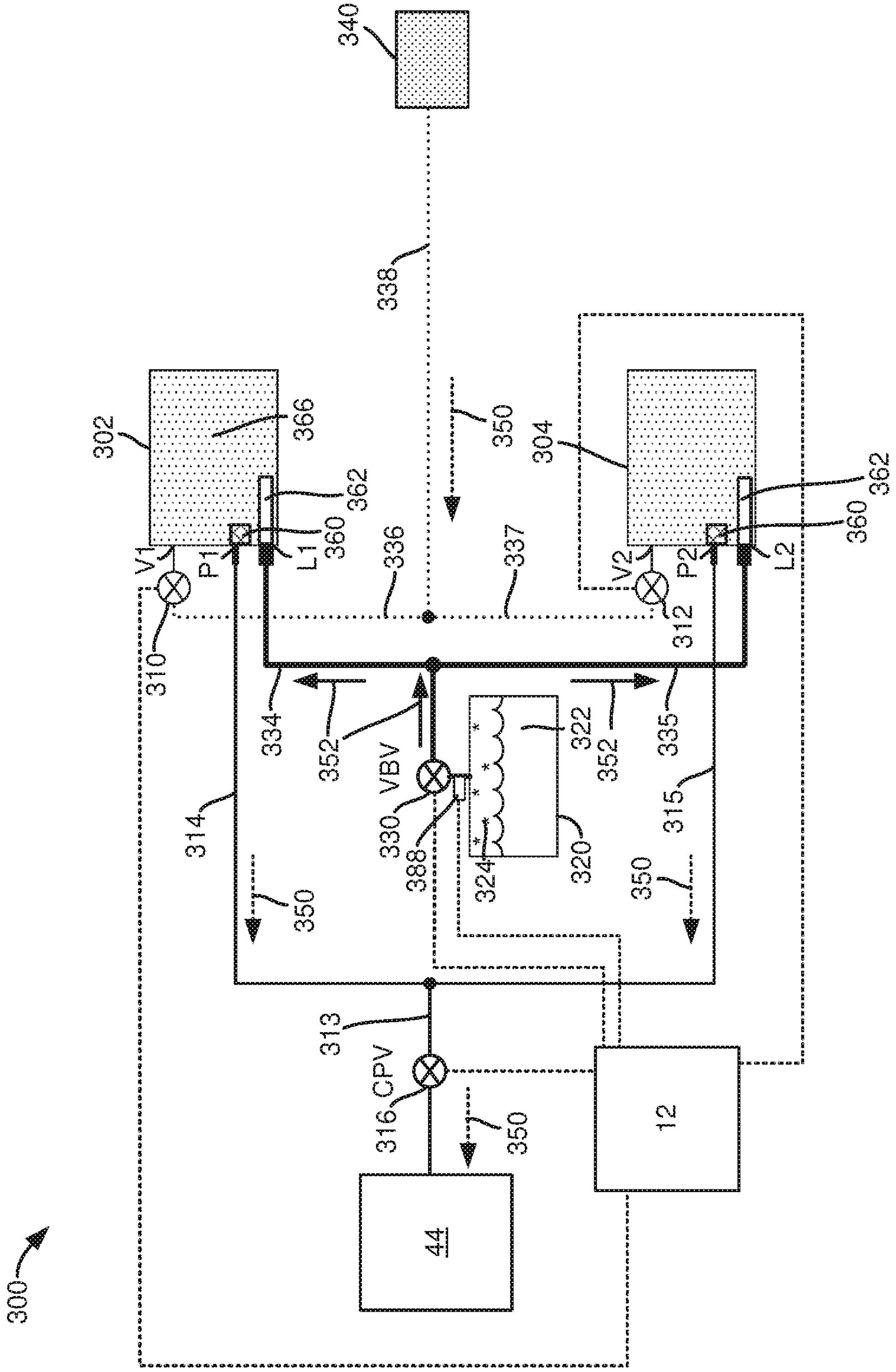
FIG. 3 shows an example evaporative emissions systems according to the present disclosure.
Figure 10:
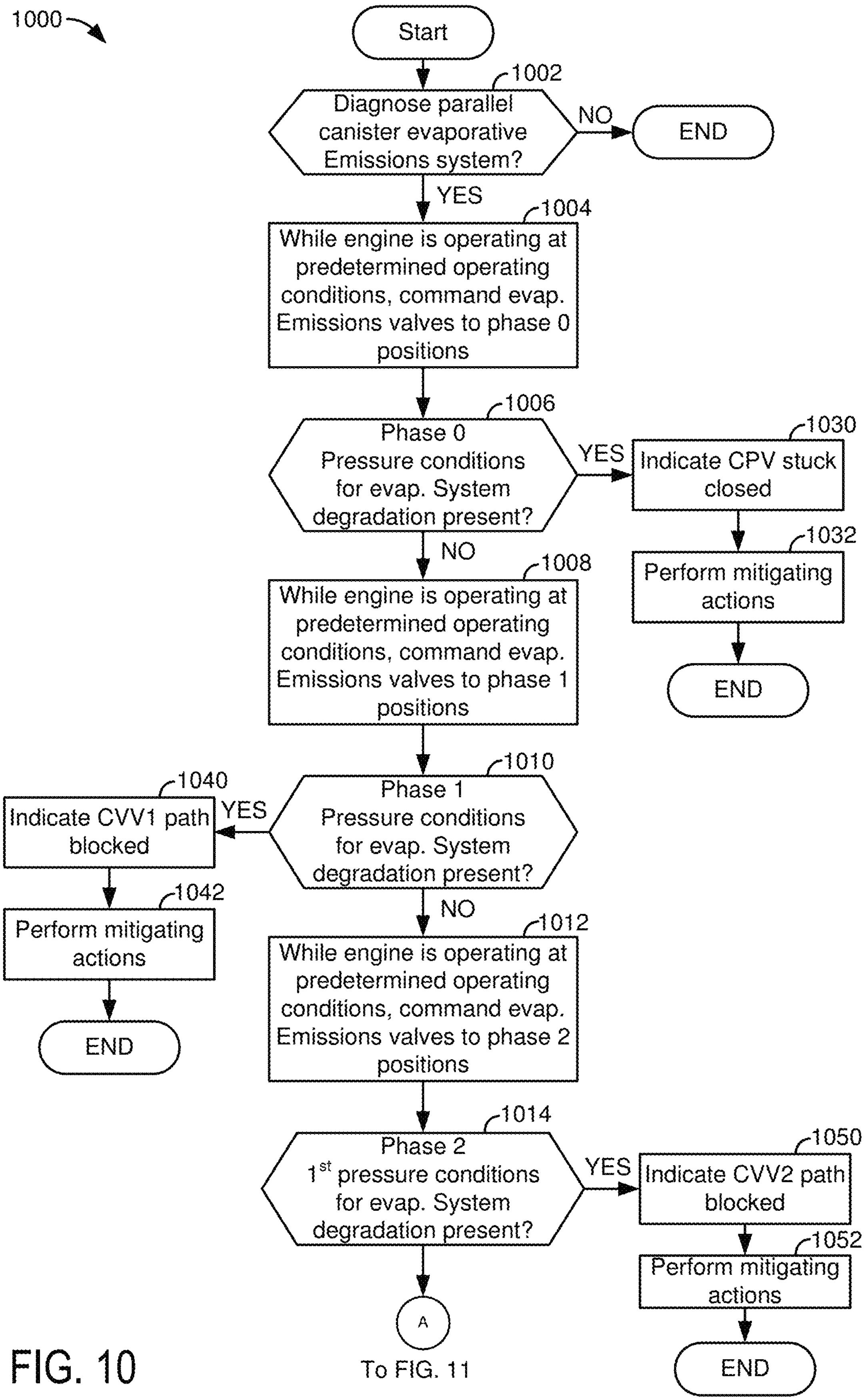
FIGS. 10 and 11 show an example method for diagnosing operation of an evaporative emissions system that includes carbon filled fuel vapor storage canisters arranged in parallel.
Figure 11:
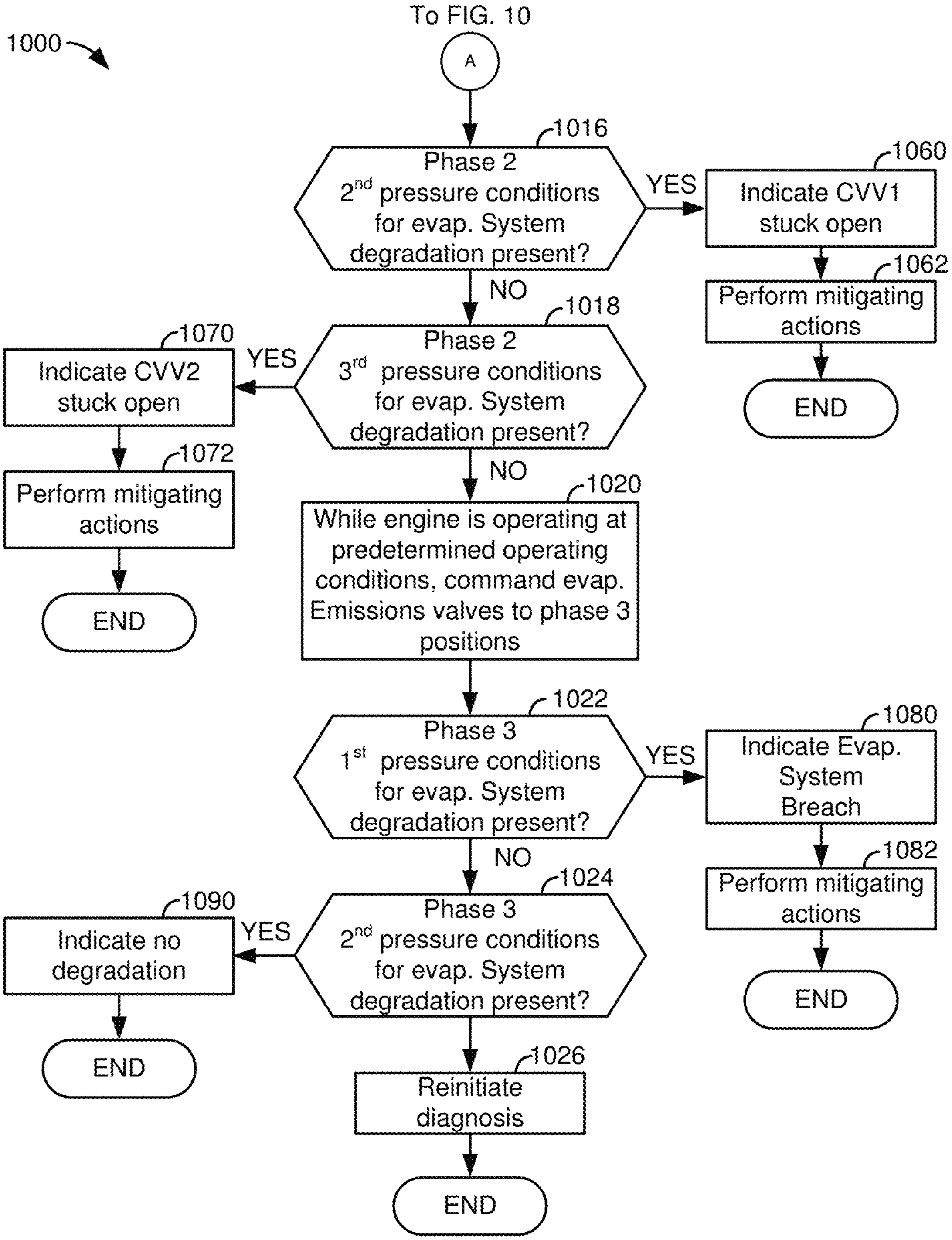

The following description relates to systems and methods for operating a vehicle and diagnosing an evaporative emissions system. The vehicle may be a heavy duty vehicle that has a large fuel tank and carbon filled fuel vapor storage canisters that are arranged in parallel. The vehicle may include an engine of the type that is shown in FIG. 1. A known evaporative emissions system is shown in FIG. 2. An example evaporative emissions systems according to the present disclosure is shown in FIG. 3. System pressures during evaporative emissions diagnostic sequences are shown in FIGS. 4-8. A table identifying evaporative emissions system degradation modes is shown in FIG. 9. An example method for diagnosing degradation of an evaporative emissions system that includes carbon filled canisters arranged in parallel is shown in FIGS. 10 and 11.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 3. The controller may employ the actuators shown in FIGS. 1 and 3 to adjust engine and evaporative emissions system operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. The intake and exhaust valves may be deactivated in a closed position so that the intake and exhaust valves do not open during a cycle of the engine (e.g., four strokes). Valve activation devices 58 and 59 may be electro-mechanical devices.

Fuel injector 66 is shown protruding into combustion chamber 30 and it is positioned to inject fuel directly into cylinder 31, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing a demand (e.g., torque or power) applied by human driver 132; a position sensor 154 coupled to caliper pedal 150 for sensing a vehicle slowing demand (e.g., torque) applied by human driver 132, a measurement of engine manifold pressure (MAP) from pressure sensor 122 coupled to intake manifold 44; an engine position sensor from an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. Controller 12 may also automatically start engine 10 in response to vehicle and engine operating conditions. Automatic engine starting may include starting engine 10 without input from human 132 to a device that is dedicated to receive input from human 132 for the sole purpose of starting and/or stopping rotation of engine 10 (e.g., a key switch or pushbutton). For example, engine 10 may be automatically stopped in response to driver demand torque being less than a threshold and vehicle speed being less than a threshold.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a block diagram of an example known evaporative emissions system 200 is shown. Evaporative emissions system 200 includes a canister purge valve 202, a carbon filled fuel vapor storage canister 204, a canister vent valve 206, a fuel tank pressure sensor 277, a fuel tank level sensor 276, a fuel cap 230, a fuel tank pressure control valve 212, a hydrocarbon sensor 275, and a refueling valve 214. In some examples, a leak detection module including a pump and change over valve may replace vent valve 206. Carbon filled fuel vapor storage canister 204 may include activated carbon 211 to store fuel vapors. Fuel tank pressure control valve 212 and refueling valve 214 are shown in fluidic communication with carbon filled fuel vapor storage canister 204 and fuel tank 220 via conduit 233. Fuel may flow from fuel cap 230 to fuel tank 220 via filler neck pipe 231. Carbon filled fuel vapor storage canister 204 may be in selective fluidic communication with intake manifold 44 via conduit 255 and canister purge valve 202.

During refilling of fuel tank 220, the refueling valve 214 and the canister vent valve 206 may be opened so that fuel vapors may exit fuel tank 220, pass though conduit 233, and be stored in carbon filled fuel vapor storage canister 204. Air that has been stripped of hydrocarbons may flow from carbon filled fuel vapor storage canister 204 to atmosphere via conduit or passage 256 and vent valve 206.

Carbon filled fuel vapor storage canister 204 may be purged of fuel vapors by opening canister purge valve 202, fully closing fuel tank pressure control valve 212, fully closing refueling valve 214, and opening canister vent valve 206. In particular, low pressure in engine intake manifold 44 may draw fuel vapors from carbon filled canister when canister purge valve 202 and canister vent valve are opened. Fresh air drawn in from atmosphere may cause fuel vapors to desorb from the carbon filled fuel vapor storage canister.

Referring now to FIG. 3, a schematic view of a first example evaporative emissions system 300 is shown. Evaporative emissions system 300 may temporarily capture fuel vapors in one or more of carbon filled fuel vapor storage canisters 302 and 304. First carbon filled fuel vapor storage canister 302 is arranged in parallel with second carbon filled fuel vapor storage canister 304.

Fuel vapors 324 may be generated in fuel tank via fuel 322 sloshing around and by filling fuel tank 320 with fuel. Fuel vapors 324 in fuel tank 320 may be released via vapor blocking valve 330 (VBV). Load line one 334 is a conduit or passage that directly fluidically couples load port L1 of first carbon filled fuel vapor storage canister 302 to load line two 335 of second carbon filled fuel vapor storage canister 304. For example, there are no intervening carbon filled fuel vapor storage canisters or valves to interfere with fluidic communication between load line one 334 and load line two 335. Fuel vapors flow in the direction that is indicated by solid arrows 352 when fuel vapors are in the process of being stored in the carbon filled fuel vapor storage canisters. Thus, fuel vapors may flow from fuel tank 320 simultaneously to first carbon filled fuel vapor storage canister 302 and second carbon filled fuel vapor storage canister 304.

Vent line one 336 is a conduit or passage that directly fluidically couples canister vent valve one 310 to vent line two 337 and exit vent line 338. Vent port one V1 of first carbon filled fuel vapor storage canister 302 is directly coupled to canister vent valve one 310. Vent line two 337 is also coupled to vent valve two 312. Vent port two V2 of second carbon filled fuel vapor storage canister 304 is directly coupled to canister vent valve two 312. Canister vent valve one 310 (e.g., CVV1) may allow selective communication between vent port one V1 and vent line one 336. Likewise, canister vent valve two 312 (e.g., CVV2) may allow selective communication between vent port two V2 and vent line two 337. Thus, canister vent valve one 310 and canister vent valve two 312 are arranged in parallel with each other as they are both coupled to vent line one 336 and in communication with exit purge line 313.

Fuel vapors 324 stored in the carbon filled canisters may be purged and combusted in engine 10 (shown in FIG. 1) by opening canister purge valve 316. A lower pressure (e.g., a vacuum) in intake manifold 44 may draw fuel vapors from purge port P1 of first carbon filled fuel vapor storage canister 302 and purge port P2 of second carbon filled fuel vapor storage canister 304 simultaneously by virtue of their parallel connection configuration. At the same time, canister vent valve one 310 and canister vent valve two 312 may be opened so that fresh air may be drawn from dust box 340 and into the vent port one V1 of first carbon filled fuel vapor storage canister 302 and vent port two V2 of second carbon filled fuel vapor storage canister 304.

Canister purge valve 316 (CPV) may be directly coupled to intake manifold 44 and exit purge line 313. Exit purge line 313 is also directly coupled to purge line one 314 and purge line two 315. Purge line one 314 is also directly coupled to purge port one P1. Purge line two 315 is also directly coupled to purge port two P2. During fuel vapor purging, flow may be in the direction as indicated by arrows 350.

Controller 12 may control canister purge valve 316, vapor blocking valve 330, canister vent valve one 310, and canister vent valve two 312. Additionally, controller 12 may sense pressure within the system via fuel tank pressure sensor 388. Each of the carbon filled fuel vapor storage canisters may include a buffer 362 and a filter 360. Filter 360 reduces migration of carbon dust out of a carbon filled canister. Buffer 362 is an area in the canister that causes fuel vapors that enters a load port from immediately exiting via a purge port so that the possibility of drawing a large fuel vapor slug into the engine may be reduced.

Thus, the system of FIGS. 1 and 3 provides for an evaporative emissions system, comprising: a plurality of carbon filled fuel vapor storage canisters arranged in parallel; a fuel tank; a pressure sensor; a canister purge valve; a first canister vent valve and a second canister vent valve; a first canister vent line coupled directly to the first canister vent valve and directly to a second canister vent line, the second canister vent line also coupled directly to the second canister vent valve, the first canister vent line coupled directly to the second canister vent line; a first canister load line coupled directly to a first carbon filled fuel vapor storage canister included in the plurality of carbon filled fuel vapor storage canisters, the first canister also coupled directly to a second canister load line, the second canister load line also directly coupled to a second carbon filled fuel vapor storage canister included in the plurality of carbon filled fuel vapor storage canisters; and a controller including executable instructions stored in non-transitory memory that cause the controller to perform an evaporative emissions system diagnostic that includes a second phase where the first canister vent valve is evaluated for being stuck open, the second canister vent valve is evaluated for being stuck open, the second canister vent valve is evaluated for being stuck closed, the second canister vent line and the second canister load line are evaluated for being plugged. In a first example, the evaporative emissions system includes where the phase is part of a plurality of phases in the evaporative emissions system diagnostic, and where in each of the plurality of phases at least one operating state of one of the canister purge valve, the first canister vent valve, and the second canister vent valve is adjusted. In a second example that may include the first example, the evaporative emissions system further comprises additional executable instructions that cause the controller to compare a pressure indicated via the pressure sensor to predetermined pressures or pressure ranges to evaluate the first canister vent valve and the second canister vent valve. In a third example that may include one or both of the first and second examples, the evaporative emissions system further comprises additional executable instructions that cause the controller to perform a zero phase of the evaporative emissions system diagnostic where the canister purge valve is evaluated for being stuck closed. In a fourth example that may include one or more of the first through third examples, the evaporative emissions system includes where the canister purge valve is evaluated based on output of the pressure sensor. In a fifth example that may include one or more of the first through fourth examples, the evaporative emissions system further comprises additional executable instructions that cause the controller to perform a first phase of the evaporative emissions system diagnostic where the first canister vent valve is evaluated for being stuck closed. In a sixth example that may include one or more of the first through fifth examples, the evaporative emissions system further comprises additional executable instructions that cause the controller to perform a third phase of the evaporative emissions system diagnostic where the evaporative emissions system is evaluated for a breach.

Figure 4:
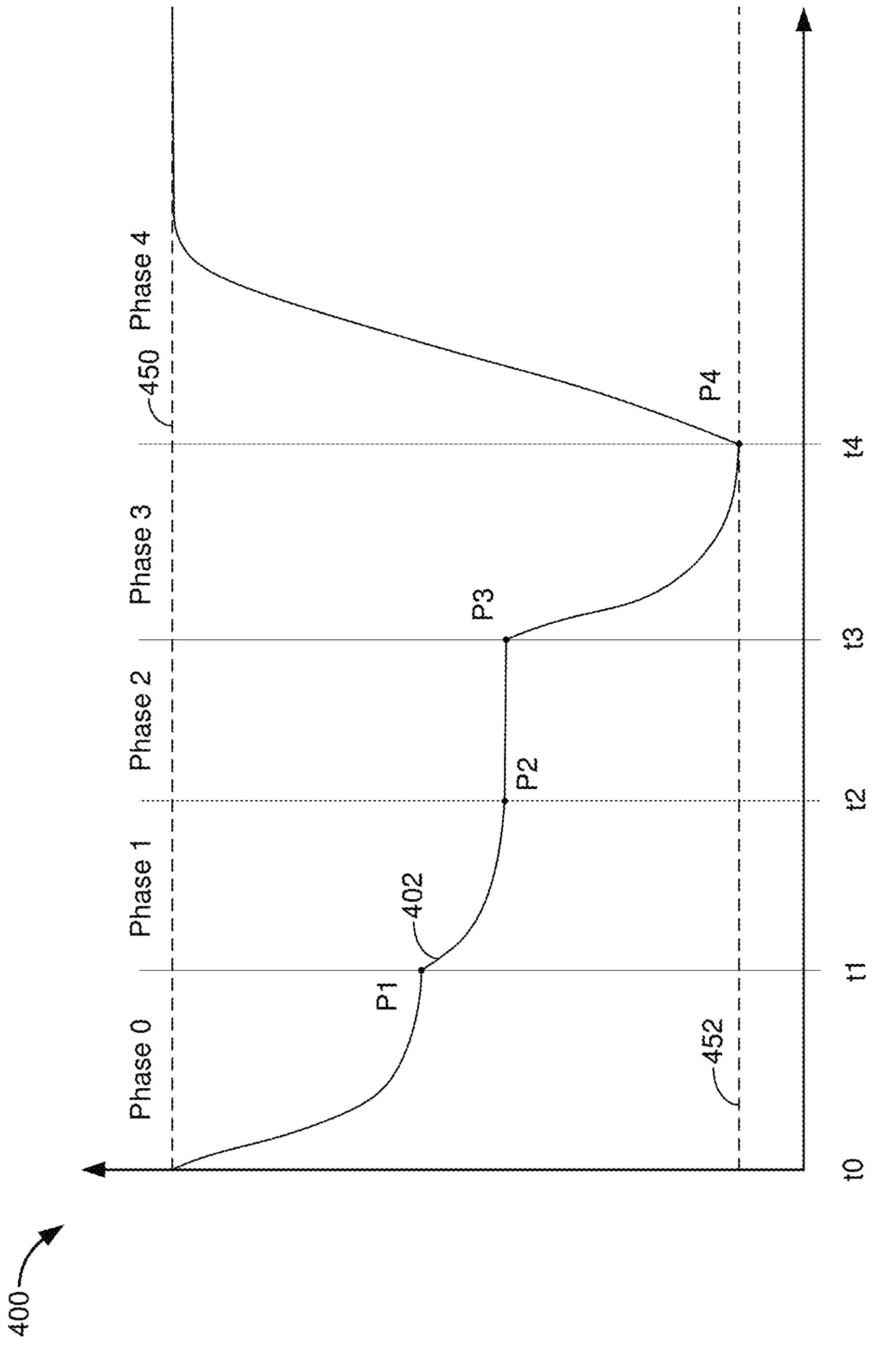
FIGS. 4-8 show example evaporative emissions system pressure during diagnostic sequences.

Referring now to FIG. 4, example pressures of an example diagnostic sequence according to the method of FIGS. 10 and 11 are shown. The sequence is performed via the system of FIGS. 1 and 3 according to the method of FIGS. 10 and 11. In this example, there are five phases (e.g., phases zero through four) of the diagnostic sequence, but fewer or additional phases may be provided in other examples. The different phases seek to isolate specific conditions that may indicate a degraded device, a breach, or alternatively, a blocked or plugged conduit. In this example, the pressures are indicative of a response of an evaporative emissions system that is operating as expected when the method of FIGS. 10 and 11 is executed. The vapor blocking valve (e.g., 330 of FIG. 3) is commanded open and is open during the entire sequence shown in FIG. 4. Plot 400 is a plot of pressure versus time. The vertical axis represents pressure and pressure increases in the direction of the vertical axis arrow. The horizontal axis represents time and time increases from the left side of the plot to the right side of the plot. Line 402 represents pressure in the fuel tank or near the vapor blocking valve 330. Line 450 represents atmospheric pressure and line 452 represents a target pressure for the end of the diagnostic sequence for a non-degraded evaporative emissions system. Vertical lines at time t0-*t*4 represent times of interest for the diagnostic sequence.

The sequence and phase zero begin at time t0. The engine is operating (e.g., rotating and combusting air and fuel) (not shown) during the entire sequence. The engine is also generating vacuum (not shown) during the entire sequence. At time t0, the canister vent valve one is commanded open, the canister vent valve two is commanded open, and the canister purge valve is commanded open. The valves operate as expected and there are no breaches or blockages in the conduits that provide fluidic communication between the various system components. Therefore, vacuum in the engine reduces pressure in the system as observed via fuel tank pressure sensor 388. A pressure drop occurs from atmosphere across the first carbon filled fuel vapor storage canister 302 and the second carbon filled fuel vapor storage canister 304 so that pressure in the fuel tank reaches pressure P1 as indicated.

Phase one of the sequence begins at time t1 when canister vent valve one remains commanded open, canister vent valve two is now commanded closed, and the canister purge valve remains commanded open. Closing canister vent valve two may cause load line two and vent line two to be considered as blocked or emulating of a stuck closed canister vent valve two. This causes a further pressure reduction in the system, which causes the system pressure to be reduced to pressure P2.

The phase two of the sequence begins at time t2 when canister vent valve one is commanded closed, canister vent valve two is commanded open, and canister purge valve is commanded open. Opening canister vent valve one and closing canister vent valve two may cause load line one and vent line one to be considered as blocked or emulating of a stuck closed canister vent valve one. This allows the system pressure to be substantially maintained as when canister vent valve one was commanded open and canister vent valve two was commanded closed. Thus, pressure in the system is now P3, which is within a predetermined pressure range of P2 (e.g., pressure P3 is within ±2% of P2) when the evaporative emissions system is operating as may be expected.

The phase three of the sequence begins at time t3 when canister vent valve one is commanded closed, canister vent valve two is commanded closed, and canister purge valve is commanded open. Closing canister vent valve one and closing canister vent valve two may cause load line one, vent line one, and vent line two to be considered as blocked or emulating of a stuck closed canister vent valve one and stuck closed canister vent valve two. This allows the system pressure to be reduced further so that system pressure approaches engine intake manifold pressure. Thus, pressure in the system is now reduced to pressure P4, which is within a predetermined pressure range of present intake manifold pressure (MP) (e.g., P4 is within 10% of MP) when the evaporative emissions system is operating as may be expected. Here, system pressure reaches threshold pressure 452, which when combined with the results of phases 0-2 indicates that the evaporative emissions system is operating as expected (e.g., no blockages or breaches at predetermined locations within the evaporative emissions system). Therefore, the sequence enters phase four where the canister purge valve is commanded closed, canister vent valve one is commanded open, and canister vent valve two is commanded open. This allows pressure in the evaporative emissions system to approach atmospheric pressure on the fuel tank side of the canister purge valve as indicated by trace 402.

Thus, an evaporative emissions system pressure profile as shown in FIG. 4 may be indicative of an evaporative emissions system that is not exhibiting degradation. The evaporative emissions system canister purge valve, canister vent valve one, and canister vent valve two may be operated to determine whether or not the evaporative emissions system of FIG. 3 is exhibiting degradation.

Figure 5:
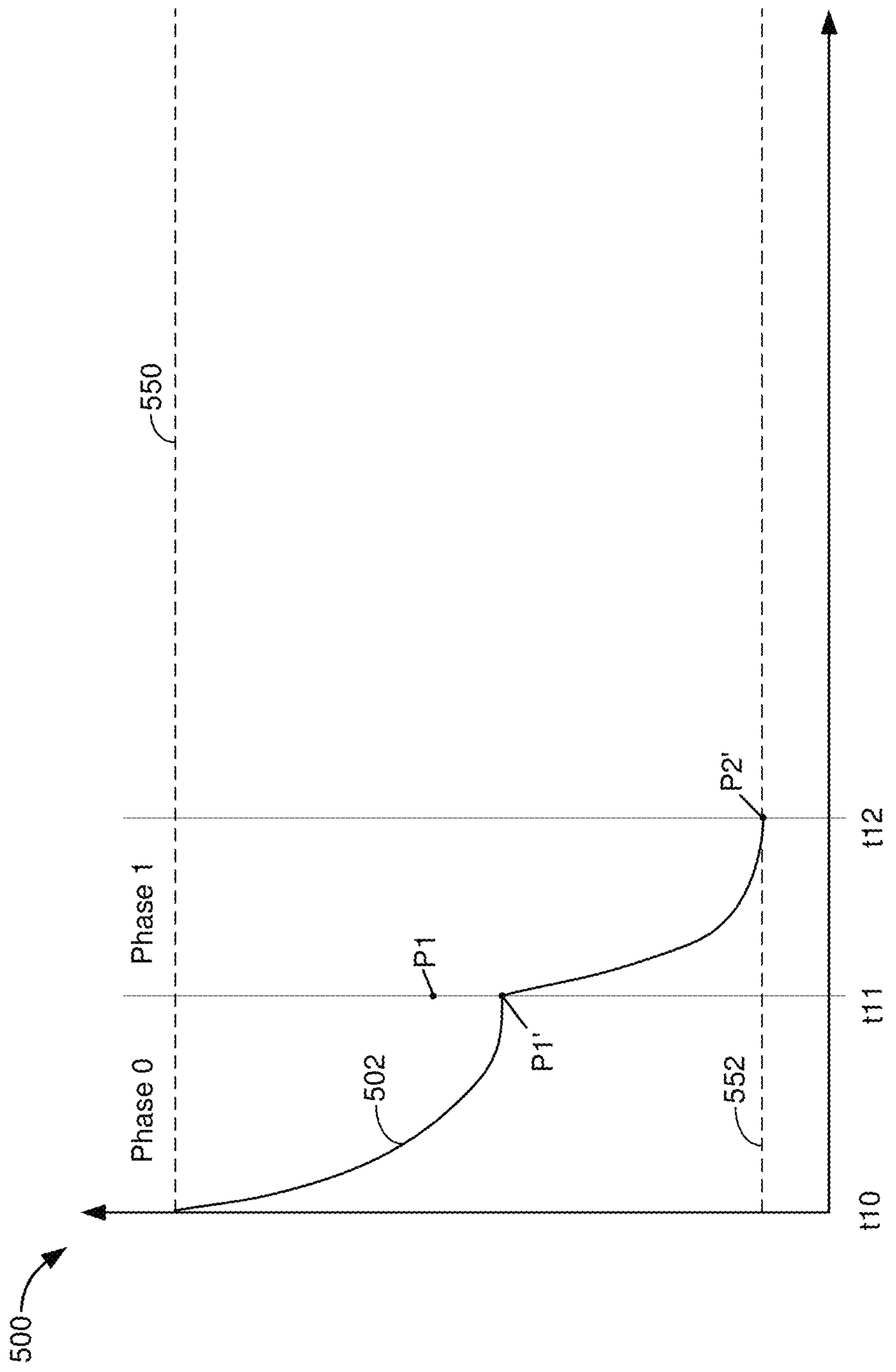

Referring now to FIG. 5, example pressures of an example diagnostic sequence according to the method of FIGS. 10 and 11 are shown. The sequence is performed via the system of FIGS. 1 and 3 according to the method of FIGS. 10 and 11. In this example, the pressures are indicative of a blockage in load line one (e.g., 334 of FIG. 1), a blockage in vent line one (e.g., 336 of FIG. 1), or canister vent valve one (e.g., 310 of FIG. 1) being stuck closed. Although, the method of FIGS. 10 and 11 describes five phases, phases zero and one are shown here since degradation is indicated before phase two is reached. The vapor blocking valve (e.g., 330 of FIG. 3) is commanded open and is open during the entire sequence shown in FIG. 5.

Plot 500 is a plot of pressure versus time. The vertical axis represents pressure and pressure increases in the direction of the vertical axis arrow. The horizontal axis represents time and time increases from the left side of the plot to the right side of the plot. Line 502 represents pressure in the fuel tank or near the vapor blocking valve 330. Line 550 represents atmospheric pressure and line 552 represents a target pressure for the end of the diagnostic sequence for a non-degraded evaporative emissions system. Vertical lines at time t10-*t*12 represent times of interest for the diagnostic sequence.

The sequence and phase zero begin at time t10. The engine is operating (e.g., rotating and combusting air and fuel) (not shown) during the entire sequence. The engine is also generating vacuum (not shown) during the entire sequence. At time t10, the canister vent valve one is commanded open, the canister vent valve two is commanded open, and the canister purge valve is commanded open. In this example, pressures indicating full blockage of load line one, full blockage of vent line one, or a canister vent valve one being stuck fully closed are shown. Therefore, vacuum in the engine reduces pressure in the system to below pressure P1, or the expected pressure at the end of phase zero when degradation of load line one, vent line one, or a stuck closed canister vent valve one occurs. The pressure drop occurs from atmosphere across a single canister vent line (canister vent line two), thereby restricting air flow into the evaporative emissions control system from the dust box (e.g., 340 of FIG. 3). Since a single canister vent line operates as a restricted air path instead of a freer flowing parallel canister vent lines, the system pressure as measured near the fuel tank is reduced to pressure P1', which is less than pressure P1 due to the restriction of the sole operating canister vent line (canister vent line two).

Phase one of the sequence begins at time t11 when canister vent valve one remains commanded open, canister vent valve two is now commanded closed, and the canister purge valve remains commanded open. Closing canister vent valve two may cause air flow into the evaporative emissions system to near zero since load line one, vent line one, or canister vent valve one is degraded in this example. The degraded load line one, degraded vent line one, or stuck fully closed canister vent valve one constrains air flow into the evaporative emissions system prevents air flow through first carbon filled fuel vapor storage canister 302. As a result, pressure in the evaporative emissions system near the fuel tank is reduced further toward engine intake manifold pressure. Pressure in the fuel system at the fuel tank reaches line 552 and the target pressure. Thus, the sequence reaches the target pressure before the end of phase three. This indicates that load line one or vent line one may be blocked, or alternatively, canister vent valve one may be stuck in a fully closed condition instead of reaching an open position as it is presently commanded. Therefore, if system pressure in the evaporative emissions system follows the profile shown in FIG. 5, it may be judged that load line one or vent line one may be blocked, or alternatively, canister vent valve one may be stuck in a fully closed.

Figure 6:
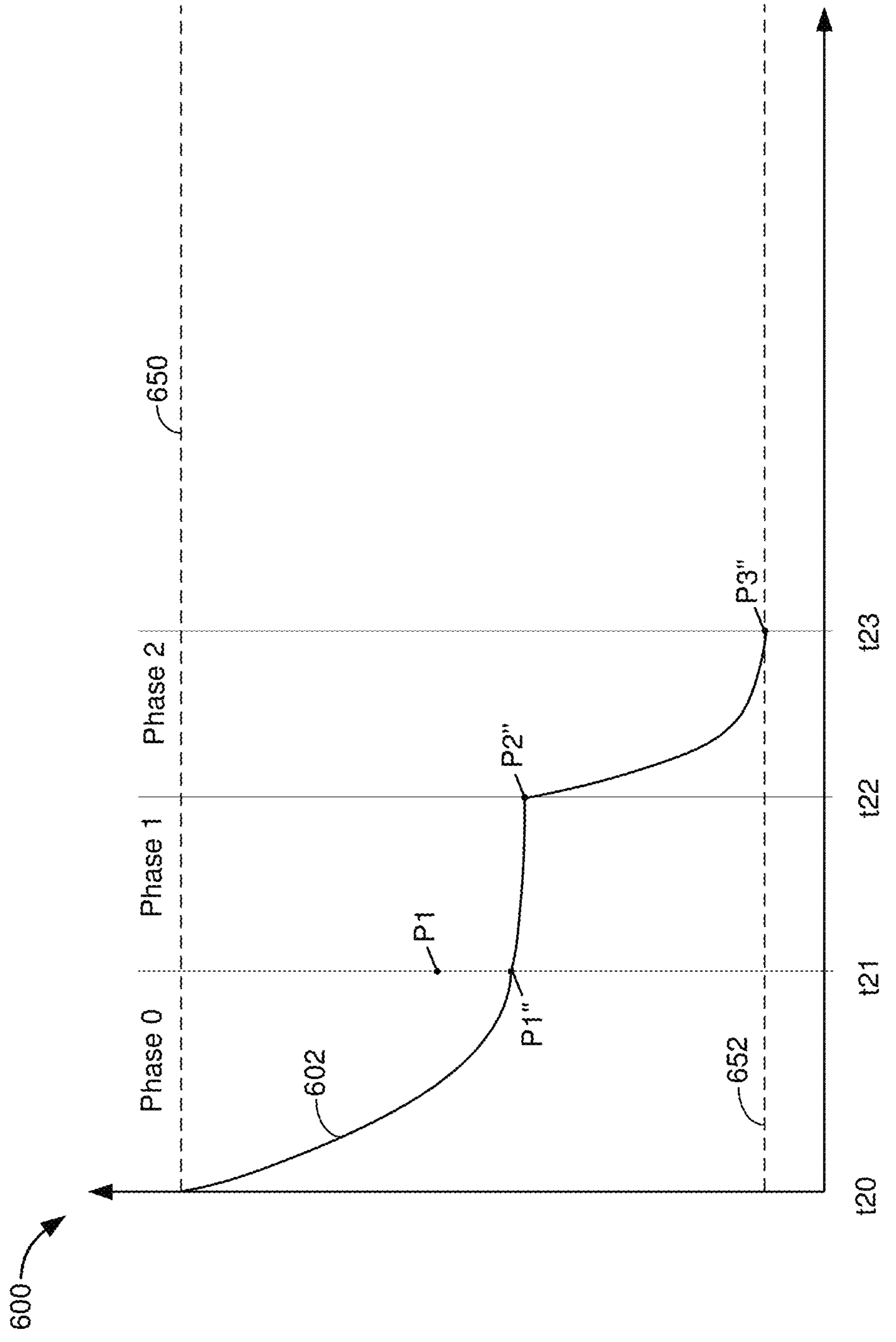

Referring now to FIG. 6, example pressures of an example diagnostic sequence according to the method of FIGS. 10 and 11 are shown. The sequence is performed via the system of FIGS. 1 and 3 according to the method of FIGS. 10 and 11. In this example, the pressures are indicative of a blockage in load line two (e.g., 335 of FIG. 1), a blockage in vent line two (e.g., 337 of FIG. 1), or canister vent valve two (e.g., 312 of FIG. 1) being stuck closed. Although, the method of FIGS. 10 and 11 describes five phases, phases zero through two are shown here since degradation is indicated before phase three is reached. The vapor blocking valve (e.g., 330 of FIG. 3) is commanded open and is open during the entire sequence shown in FIG. 6.

Plot 600 is a plot of pressure versus time. The vertical axis represents pressure and pressure increases in the direction of the vertical axis arrow. The horizontal axis represents time and time increases from the left side of the plot to the right side of the plot. Line 602 represents pressure in the fuel tank or near the vapor blocking valve 330. Line 650 represents atmospheric pressure and line 652 represents a target pressure for the end of the diagnostic sequence for a non-degraded evaporative emissions system. Vertical lines at time t20-*t*23 represent times of interest for the diagnostic sequence.

The sequence and phase zero begin at time t20. The engine is operating (e.g., rotating and combusting air and fuel) (not shown) during the entire sequence. The engine is also generating vacuum (not shown) during the entire sequence. At time t20, the canister vent valve one is commanded open, the canister vent valve two is commanded open, and the canister purge valve is commanded open. In this example, pressures indicating full blockage of load line two, full blockage of vent line two, or a canister vent valve two being stuck fully closed are shown. Therefore, vacuum in the engine reduces pressure in the system to below pressure P1, or the expected pressure at the end of phase zero when degradation of load line two, vent line two, or a stuck closed canister vent valve two occurs. The pressure drop occurs from atmosphere across a single canister vent line (canister vent line one), thereby restricting air flow into the evaporative emissions control system from the dust box (e.g., 340 of FIG. 3). Since a single canister vent line operates as a restricted air path instead of freer flowing parallel canister vent lines, the system pressure as measured near the fuel tank is reduced to pressure P1', which is less than pressure P1 due to the restriction of the sole operating canister vent line (canister vent line one).

Phase one of the sequence begins at time t21 when canister vent valve one remains commanded open, canister vent valve two is now commanded closed, and the canister purge valve remains commanded open. Closing canister vent valve two does not cause much, if any, air flow change into the evaporative emissions system since in this example, load line two, vent line two, or canister vent valve two is degraded. The degraded load line two, degraded vent line two, or stuck fully closed canister vent valve two already constrains air flow into the evaporative emissions system so closing canister vent valve two does not generate a change in pressure within the evaporative emissions system. As a result, pressure in the evaporative emissions system near the fuel tank is substantially unchanged (e.g., changes by less than 5% of reading). Pressure in the fuel system at the fuel tank reaches pressure P2".

Phase two of the sequence begins at time t22 when canister vent valve one is commanded closed, canister vent valve two is now commanded open, and the canister purge valve remains commanded open. Closing canister vent valve one may cause air flow into the evaporative emissions system to near zero since load line two, vent line two, or canister vent valve two is degraded (stuck fully closed) in this example. The degraded load line two, degraded vent line two, or stuck fully closed canister vent valve two constrains air flow into the evaporative emissions system prevents air flow through second carbon filled fuel vapor storage canister 304. As a result, pressure in the evaporative emissions system near the fuel tank is reduced further toward engine intake manifold pressure. Pressure in the fuel system at the fuel tank reaches line 652 and the target pressure. Thus, the sequence reaches the target pressure before the end of phase three. This indicates that load line one or vent line two may be blocked, or alternatively, canister vent valve two may be stuck in a fully closed condition instead of reaching an open position as it is presently commanded. Therefore, if system pressure in the evaporative emissions system follows the profile shown in FIG. 6, it may be judged that load line two or vent line two may be blocked, or alternatively, canister vent valve two may be stuck in a fully closed.

Figure 7:
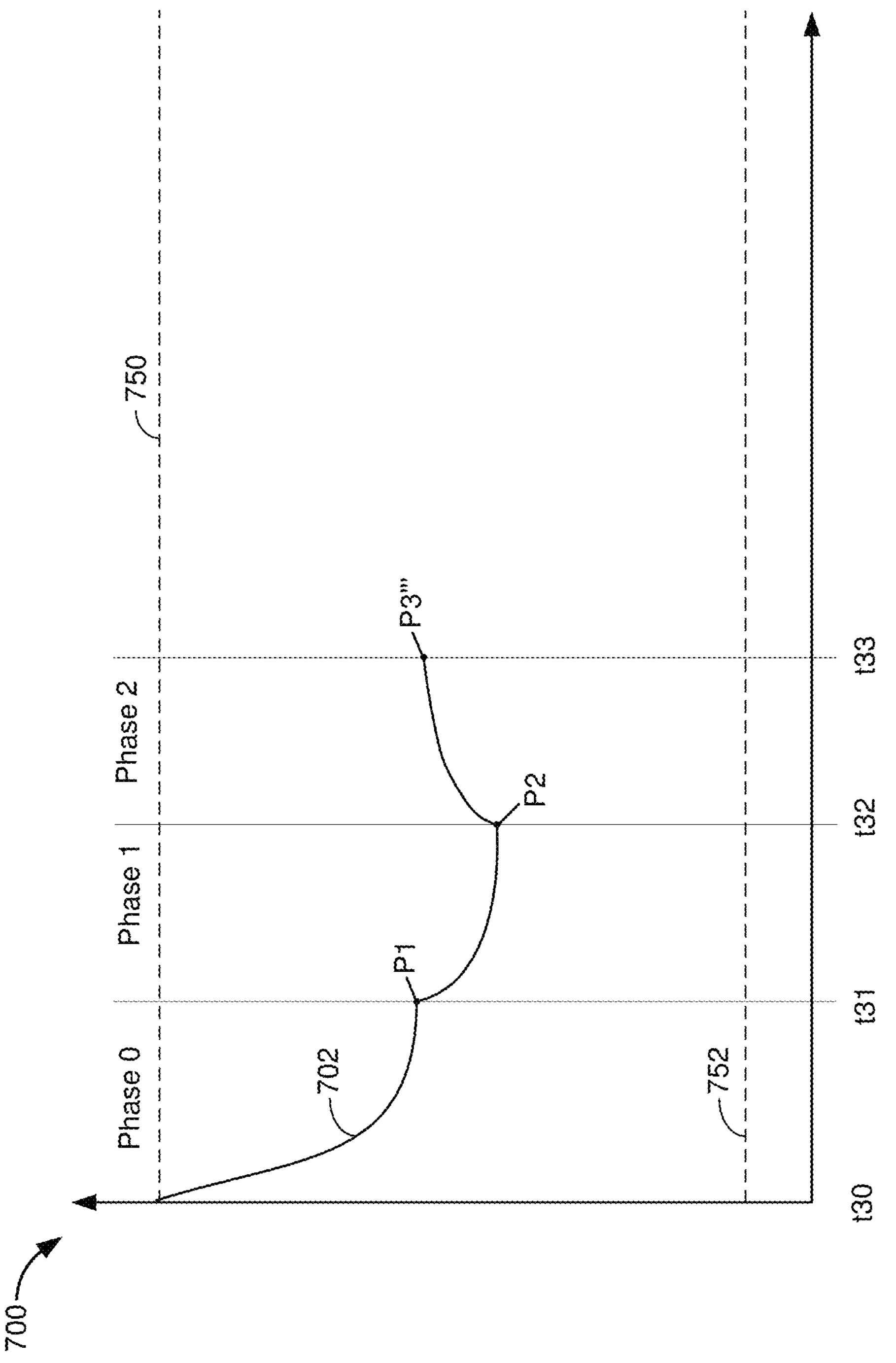

Referring now to FIG. 7, example pressures of an example diagnostic sequence according to the method of FIGS. 10 and 11 are shown. The sequence is performed via the system of FIGS. 1 and 3 according to the method of FIGS. 10 and 11. In this example, the pressures are indicative of canister vent valve one (e.g., 310 of FIG. 1) being stuck open. Although, the method of FIGS. 10 and 11 describes five phases, phases zero through two are shown here since degradation is indicated before phase three is reached. The vapor blocking valve (e.g., 330 of FIG. 3) is commanded open and is open during the entire sequence shown in FIG. 6.

Plot 700 is a plot of pressure versus time. The vertical axis represents pressure and pressure increases in the direction of the vertical axis arrow. The horizontal axis represents time and time increases from the left side of the plot to the right side of the plot. Line 702 represents pressure in the fuel tank or near the vapor blocking valve 330. Line 750 represents atmospheric pressure and line 752 represents a target pressure for the end of the diagnostic sequence for a non-degraded evaporative emissions system. Vertical lines at time t30-*t*33 represent times of interest for the diagnostic sequence.

The sequence and phase zero begin at time t30. The engine is operating (e.g., rotating and combusting air and fuel) (not shown) during the entire sequence. The engine is also generating vacuum (not shown) during the entire sequence. At time t30, the canister vent valve one is commanded open, the canister vent valve two is commanded open, and the canister purge valve is commanded open. In this example, pressures indicating canister vent valve one is stuck fully open are shown. Therefore, vacuum in the engine reduces pressure in the system to pressure P1, or the expected pressure at the end of phase zero when canister vent valve one is stuck open. The pressure drop occurs from atmosphere across two canister vent lines (canister vent line one and canister vent line two). Therefore, there is no pressure difference from a non-degraded system in phase zero of the diagnostic sequence.

Phase one of the sequence begins at time t31 when canister vent valve one remains commanded open, canister vent valve two is now commanded closed, and the canister purge valve remains commanded open. Closing canister vent valve two restricts air flow into the evaporative emissions system. Therefore, the system pressure drops to P2 in a same way that pressure drops to P2 in a non-degraded evaporative emissions system during a diagnostic.

Phase two of the sequence begins at time t32 when canister vent valve one is commanded closed, canister vent valve two is now commanded open, and the canister purge valve remains commanded open. Opening canister vent valve two when canister vent valve one is stuck open increases air flow into the evaporative emissions system, so pressure in the evaporative emissions system increases. The increase in air flow is the result of now having two open flow paths between atmosphere and the fuel tank. Thus, system pressure increases from pressure P2 to pressure P3''' as indicated by line 702. This indicates that canister vent valve one is in a stuck fully open position. Therefore, if system pressure in the evaporative emissions system follows the profile shown in FIG. 7, it may be judged that canister vent valve one is stuck open.

Figure 8:
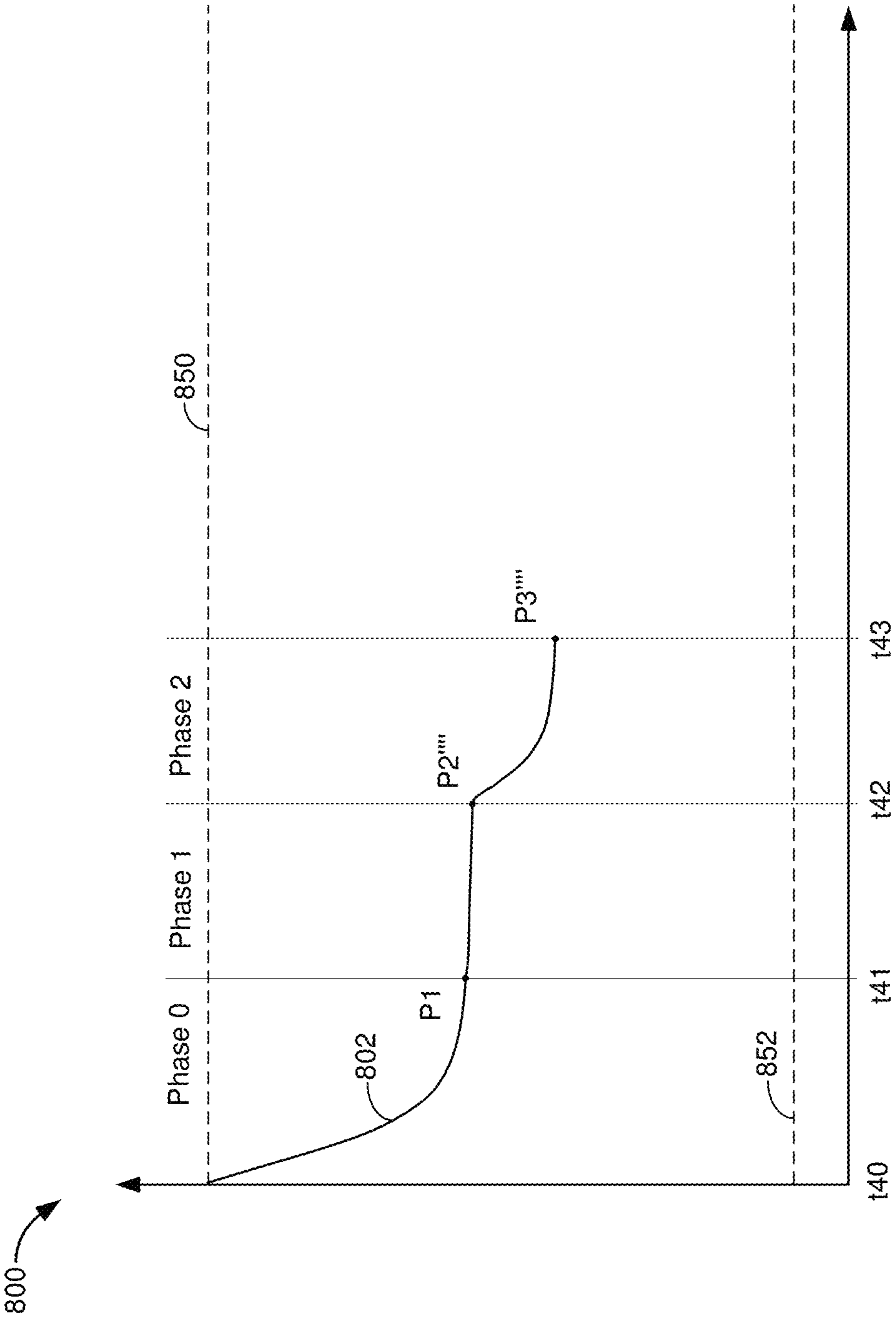

Referring now to FIG. 8, example pressures of an example diagnostic sequence according to the method of FIGS. 10 and 11 are shown. The sequence is performed via the system of FIGS. 1 and 3 according to the method of FIGS. 10 and 11. In this example, the pressures are indicative of canister vent valve two (e.g., 312 of FIG. 1) being stuck open. Although, the method of FIGS. 10 and 11 describes five phases, phases zero through two are shown here since degradation is indicated before phase three is reached. The vapor blocking valve (e.g., 330 of FIG. 3) is commanded open and is open during the entire sequence shown in FIG. 6.

Plot 800 is a plot of pressure versus time. The vertical axis represents pressure and pressure increases in the direction of the vertical axis arrow. The horizontal axis represents time and time increases from the left side of the plot to the right side of the plot. Line 802 represents pressure in the fuel tank or near the vapor blocking valve 330. Line 850 represents atmospheric pressure and line 852 represents a target pressure for the end of the diagnostic sequence for a non-degraded evaporative emissions system. Vertical lines at time t40-*t*43 represent times of interest for the diagnostic sequence.

The sequence and phase zero begin at time t40. The engine is operating (e.g., rotating and combusting air and fuel) (not shown) during the entire sequence. The engine is also generating vacuum (not shown) during the entire sequence. At time t40, the canister vent valve one is commanded open, the canister vent valve two is commanded open, and the canister purge valve is commanded open. In this example, pressures indicating canister vent valve two is stuck fully open are shown. Therefore, vacuum in the engine reduces pressure in the system to pressure P1, or the expected pressure at the end of phase zero when canister vent valve two is stuck open. The pressure drop occurs from atmosphere across two canister vent lines (canister vent line one and canister vent line two). Therefore, there is no pressure difference from a non-degraded system in phase zero of the diagnostic sequence.

Phase one of the sequence begins at time t41 when canister vent valve one remains commanded open, canister vent valve two is now commanded closed, and the canister purge valve remains commanded open. Commanding canister vent valve two close has no effect on system pressure since canister vent valve two is stuck fully open. Therefore, air flow into the evaporative emissions system is not further restricted and system pressure moves from P1 to P2'''', where pressure P2'''' may be within ±2% of P1. However, there is presently insufficient pressure data at this time to indicate that canister vent valve two is degraded. Therefore, the sequence continues to phase two.

Phase two of the sequence begins at time t42 when canister vent valve one is commanded closed, canister vent valve two is now commanded open, and the canister purge valve remains commanded open. Closing canister vent valve one when canister vent valve two is stuck open decreases air flow into the evaporative emissions system, so pressure in the evaporative emissions system decreases. The decrease in air flow is the result of now having a sole open flow paths between atmosphere and the fuel tank. Thus, system pressure decreases from pressure P2'''' to pressure P3''' as indicated by line 802. This indicates that canister vent valve two is in a stuck fully open position. Therefore, if system pressure in the evaporative emissions system follows the profile shown in FIG. 8, it may be judged that canister vent valve one is stuck open.

Turning now to FIG. 9, a table 900 showing one way of determining degradation of an evaporative emissions system that includes two carbon filled fuel vapor storage canisters is shown. Table 900 includes eight rows 902 and three columns 904. The first row from the top of table 900 and the first column from the left side of table 900 recites "Phase" to indicate the phase of the evaporative emissions diagnostic sequence. The first row from the top of table 900 and the second column from the left side of table 900 recites "Delta pressure" to indicate the differential pressure in the evaporative emissions system with respect to atmospheric pressure. The third row from the top of table 900 and the first column from the left side of table 900 recites "Degradation mode" to indicate whether or not the evaporative system is degraded, and if so, what evaporative emissions systems component is degraded. Rows 2-8 from the top of table 900 and column 1 from the left side of table 900 indicate the phase of the evaporative emissions system sequence in which the evaporative emissions system is indicated as degraded or not degraded. Rows 2-8 from the top of table 900 and column 2 from the left side of table 900 indicate the system pressure range that is indicative of degradation of the evaporative emissions system. Rows 2-8 from the top of table 900 and column 3 from the left side of table 900 indicate the degradation modes for the evaporative emissions system. The numeric values in the second column from the left of table 900 may be adjusted depending on application, carbon filled fuel vapor storage volume, and other system conditions.

Table 900 may be a basis for whether or not an evaporative emissions system is degraded. For example, if the sequences as shown in FIGS. 4-8 are performed, a stuck closed canister purge valve (CPV) may be determined when the pressure difference between atmospheric pressure and evaporative emissions system pressure (e.g., pressure at the location of a pressure sensor in the evaporative emissions system) is substantially zero in the first phase of the evaporative emissions system diagnostic. A stuck closed canister vent valve one (CVV1), plugged vent line one, or a plugged load line one may be indicated when the pressure differential between atmospheric pressure and evaporative emissions system pressure in phase one of the evaporative emissions diagnostic (dP1) is less than −6 inches of water. A stuck open canister vent valve one (CVV1) may be indicated when the pressure differential between atmospheric pressure and evaporative emissions system pressure in phase one of the evaporative emissions diagnostic (dP1) is less than −0.5 inches of water and when evaporative emissions system pressure in phase two of the evaporative emissions diagnostic (dP2) is greater than 0.25 inches of water. A stuck open canister vent valve two (CVV2) may be indicated when the pressure differential between atmospheric pressure and evaporative emissions system pressure in phase one of the evaporative emissions diagnostic (dP1) is greater than −1.25 inches of water and when evaporative emissions system pressure in phase two of the evaporative emissions diagnostic (dP2) is less than −0.25 inches of water. A stuck closed canister vent valve two (CVV2), plugged vent line two, or a plugged load line two may be indicated when the pressure differential between atmospheric pressure and evaporative emissions system pressure in phase two of the evaporative emissions diagnostic (dP2) is less than −6 inches of water. No evaporative emissions system degradation may be indicated when the pressure differential between atmospheric pressure and evaporative emissions system pressure in phase three of the evaporative emissions diagnostic (dP3) is less than −6 inches of water. An evaporative emissions system breach may be indicated when the pressure differential between atmospheric pressure and evaporative emissions system pressure in phase three of the evaporative emissions diagnostic (dP1) is less than −3 inches of water and greater than −6 inches of water.

Referring now to FIGS. 10 and 11, an example method 1000 for diagnosing operation of an evaporative emissions system is shown. At least portions of method 1000 may be included in and cooperate with a system as shown in FIGS. 1 and 3 as executable instructions stored in non-transitory memory. The method of FIGS. 10 and 11 may cause the controller to actuate the actuators in the real world and receive data and signals from sensors described herein when the method is realized as executable instructions stored in controller memory. Method 1000 may execute when the vehicle's engine is operating at predetermined conditions where greater than a threshold amount of vacuum may be generated within the engine's intake manifold. The engine may or may not be rotating and combusting fuel during the execution of method 1000.

At 1002, method 1000 judges whether or not to diagnose an evaporative emissions system and its carbon filled fuel vapor storage canisters that are arranged in parallel. In one example, method 1000 may choose to diagnose the evaporative emissions system after predetermined conditions have been met. The predetermined conditions may include but are not limited to an amount of time since a last most recent evaporative emissions system diagnosis exceeding a threshold amount of time, a predetermined actual total number of most recent engine starts has exceeded a threshold, the carbon filled fuel vapor canisters being filled with fuel vapors, and/or a manual request to diagnose the evaporative emissions system. If method 1000 judges that conditions have been met to diagnose the evaporative emissions system that includes carbon filled fuel vapor storage canisters arranged in parallel as shown in FIG. 3, the answer is yes and method 1000 proceeds to 1004. Otherwise, the answer is no and method 1000 proceeds to exit.

At 1004, method 1000 enters phase zero of an evaporative emissions system diagnostic where method 1000 commands the canister purge valve fully open, commands canister vent valve one fully open, and commands canister vent valve two fully open. Method 1000 may remain in phase zero for a predetermined amount of time or until specific conditions are met. For example, method 1000 may remain in phase zero for 10 seconds or until evaporative emissions system pressure stabilizes within a prescribed pressure range. Method 1000 proceeds to 1006.

At 1006, method 1000 judges whether or not evaporative emissions system conditions during phase zero are indicative of evaporative emissions system degradation. If so, the answer is yes and method 1000 proceeds to 1030. Otherwise, the answer is no and method 1000 proceeds to 1008. In one example, method 1000 may judge that conditions during phase zero of the present evaporative emissions system diagnostic are indicative of degradation occur when a pressure difference between atmospheric pressure and an evaporative emissions system pressure (e.g., pressure within the evaporative emissions system at a location of a pressure sensor) is substantially zero (e.g., less than 1 inch of water pressure differential).

At 1030, method 1000 indicates that the canister purge valve (CPV) is stuck closed. Method 1000 may indicate that the canister purge valve is stuck via displaying a message at the human/machine interface 11. Method 1000 proceeds to 1032.

At 1032, method 1000 performs mitigating actions based on the evaporative emissions system degradation. In one example, method 1000 may make several attempts to cycle the canister purge valve by commanding the canister purge valve to open and close several times. If the canister purge valve does not open, then method 1000 may take additional actions, such as opening canister vent valve one, canister vent valve two, and the vapor blocking valve when pressure in the fuel tank exceeds a threshold pressure to constrain fuel tank pressure. Method 1000 proceeds to exit.

At 1008, method 1000 enters phase one of an evaporative emissions system diagnostic where method 1000 commands the canister purge valve fully open, commands canister vent valve one fully open, and commands canister vent valve two fully closed. Method 1000 may remain in phase one for a predetermined amount of time or until specific conditions are met. For example, method 1000 may remain in phase zero for 10 seconds or until evaporative emissions system pressure stabilizes within a prescribed pressure range. Method 1000 proceeds to 1010.

At 1010, method 1000 judges whether or not evaporative emissions system conditions during phase one are indicative of evaporative emissions system degradation. If so, the answer is yes and method 1000 proceeds to 1040. Otherwise, the answer is no and method 1000 proceeds to 1012. In one example, method 1000 may judge that conditions during phase one of the present evaporative emissions system diagnostic are indicative of degradation occur when a pressure difference between atmospheric pressure and an evaporative emissions system pressure (e.g., pressure within the evaporative emissions system at a location of a pressure sensor) is less than a predetermined pressure, −6 inches of water or 1.49 kilopascals.

At 1040, method 1000 indicates that the canister vent valve one (CVV1) is stuck closed, vent line one is plugged, or load line one is plugged. Method 1000 may indicate that the canister vent valve one (CVV1) is stuck closed, vent line one is plugged, or load line one is plugged via displaying a message at the human/machine interface 11. Method 1000 proceeds to 1042.

At 1042, method 1000 performs mitigating actions based on the evaporative emissions system degradation. In one example, method 1000 may make several attempts to cycle canister vent valve one by commanding the canister vent valve one to open and close several times. If the canister vent valve one does not open, then method 1000 may take additional actions, such as increasing canister purge valve opening time during purging of fuel vapors and/or increasing purge vapor purging duration to compensate for lower flow through the evaporative emissions system. Method 1000 proceeds to exit.

At 1012, method 1000 enters phase two of an evaporative emissions system diagnostic where method 1000 commands the canister purge valve fully open, commands canister vent valve one fully closed, and commands canister vent valve two fully open. Method 1000 may remain in phase two for a predetermined amount of time or until specific conditions are met. For example, method 1000 may remain in phase two for 10 seconds or until evaporative emissions system pressure stabilizes within a prescribed pressure range (e.g., a target vacuum level). Method 1000 proceeds to 1014.

At 1014, method 1000 judges whether or not a first evaporative emissions system condition that is indicative of evaporative emissions system degradation is present during phase two of the evaporative emissions system diagnostic sequence. If so, the answer is yes and method 1000 proceeds to 1050. Otherwise, the answer is no and method 1000 proceeds to 1016. In one example, method 1000 may judge that the first conditions during phase two of the present evaporative emissions system diagnostic is indicative of degradation may occur when a pressure difference between atmospheric pressure and an evaporative emissions system pressure (e.g., pressure within the evaporative emissions system at a location of a pressure sensor) is less than a predetermined pressure, less than −6 inches of water or 1.49 kilopascals for example.

At 1050, method 1000 indicates that the canister vent valve two (CVV2) is stuck closed, vent line one is plugged, or load line one is plugged. Method 1000 may indicate that the canister vent valve two (CVV2) is stuck closed, vent line two is plugged, or load line two is plugged via displaying a message at the human/machine interface 11. Method 1000 proceeds to 1052.

At 1052, method 1000 performs mitigating actions based on the evaporative emissions system degradation. In one example, method 1000 may make several attempts to cycle canister vent valve two by commanding the canister vent valve two to open and close several times. If the canister vent valve two does not open, then method 1000 may take additional actions, such as increasing canister purge valve opening time during purging of fuel vapors and/or increasing purge vapor purging duration to compensate for lower flow through the evaporative emissions system. Method 1000 proceeds to exit.

At 1016, method 1000 judges whether or not a second evaporative emissions system condition that is indicative of evaporative emissions system degradation is present during phase two of the evaporative emissions system diagnostic sequence. If so, the answer is yes and method 1000 proceeds to 1060. Otherwise, the answer is no and method 1000 proceeds to 1018. In one example, method 1000 may judge that the second condition during phase two of the present evaporative emissions system diagnostic is indicative of degradation is present when a pressure difference between atmospheric pressure and an evaporative emissions system pressure (e.g., pressure within the evaporative emissions system at a location of a pressure sensor) is less than a predetermined pressure (e.g., −0.5 inches of water) during the first phase of the evaporative emissions system diagnostic sequence and when a pressure difference between atmospheric pressure and an evaporative emissions system pressure is greater than a predetermined pressure (e.g., 0.25 inches of water) during the second phase of the evaporative emissions system diagnostic sequence.

At 1060, method 1000 indicates that the canister vent valve one (CVV1) is stuck open. Method 1000 may indicate that the canister vent valve one (CVV1) is stuck open via displaying a message at the human/machine interface 11. Method 1000 proceeds to 1062.

At 1062, method 1000 performs mitigating actions based on the evaporative emissions system degradation. In one example, method 1000 may make several attempts to cycle canister vent valve one by commanding the canister vent valve one to open and close several times. If the canister vent valve one does not open, then method 1000 may take additional actions, such as increasing canister purge valve opening time during purging of fuel vapors and/or increasing purge vapor purging duration to compensate for lower flow through the evaporative emissions system. Method 1000 proceeds to exit.

At 1018, method 1000 judges whether or not a third evaporative emissions system condition that is indicative of evaporative emissions system degradation is present during phase two of the evaporative emissions system diagnostic sequence. If so, the answer is yes and method 1000 proceeds to 1060. Otherwise, the answer is no and method 1000 proceeds to 1020. In one example, method 1000 may judge that the third condition that is indicative of evaporative emissions system degradation during phase two of the present evaporative emissions system diagnostic is present when a pressure difference between atmospheric pressure and an evaporative emissions system pressure (e.g., pressure within the evaporative emissions system at a location of a pressure sensor) is greater than a predetermined pressure (e.g., −1.25 inches of water) during the first phase of the evaporative emissions system diagnostic sequence and when a pressure difference between atmospheric pressure and an evaporative emissions system pressure is less than a predetermined pressure (e.g., −0.25 inches of water) during the second phase of the evaporative emissions system diagnostic sequence.

At 1070, method 1000 indicates that the canister vent valve two (CVV2) is stuck open. Method 1000 may indicate that the canister vent valve two (CVV2) is stuck open via displaying a message at the human/machine interface 11. Method 1000 proceeds to 1072.

At 1072, method 1000 performs mitigating actions based on the evaporative emissions system degradation. In one example, method 1000 may make several attempts to cycle canister vent valve two by commanding the canister vent valve two to open and close several times. If the canister vent valve two does not open, then method 1000 may take additional actions, such as increasing canister purge valve opening time during purging of fuel vapors and/or increasing purge vapor purging duration to compensate for lower flow through the evaporative emissions system. Method 1000 proceeds to exit.

At 1020, method 1000 enters phase three of an evaporative emissions system diagnostic where method 1000 commands the canister purge valve fully open, commands canister vent valve one fully closed, and commands canister vent valve two fully closed. Method 1000 may remain in phase three for a predetermined amount of time or until specific conditions are met. For example, method 1000 may remain in phase three for 10 seconds or until evaporative emissions system pressure stabilizes within a prescribed pressure range (e.g., a target vacuum level). Method 1000 proceeds to 1022.

At 1022, method 1000 judges whether or not a first evaporative emissions system condition that is indicative of evaporative emissions system degradation is present during phase three of the evaporative emissions system diagnostic sequence. If so, the answer is yes and method 1000 proceeds to 1080. Otherwise, the answer is no and method 1000 proceeds to 1024. In one example, method 1000 may judge that the first conditions during phase three of the present evaporative emissions system diagnostic is indicative of a breach in the evaporative emissions system when a pressure difference between atmospheric pressure and an evaporative emissions system pressure (e.g., pressure within the evaporative emissions system at a location of a pressure sensor) is greater than a first predetermined pressure (e.g., −3 inches of water) during the third phase of the evaporative emissions system diagnostic sequence and when a pressure difference between atmospheric pressure and an evaporative emissions system pressure is greater than a predetermined pressure (e.g., −6 inches of water) during the third phase of the evaporative emissions system diagnostic sequence.

At 1080, method 1000 indicates that there is a breach in the evaporative emissions system. the canister vent valve two (CVV2) is stuck closed, vent line one is plugged (e.g., obstructed so that flow is prevented through the line), or load line one is plugged. Method 1000 may indicate that a breach of the evaporative emissions system is present via displaying a message at the human/machine interface 11. Method 1000 proceeds to 1082.

At 1082, method 1000 performs mitigating actions based on the evaporative emissions system degradation. In one example, method 1000 may cease operating the canister purge valve, canister vent valve one, and canister vent valve two by commanding them closed. Method 1000 proceeds to exit.

At 1024, method 1000 judges whether or not a second evaporative emissions system condition that is indicative of evaporative emissions system degradation is present during phase three of the evaporative emissions system diagnostic sequence. If so, the answer is yes and method 1000 proceeds to 1080. Otherwise, the answer is no and method 1000 proceeds to 1026. In one example, method 1000 may judge that the second condition during phase three of the present evaporative emissions system diagnostic is indicative of a breach in the evaporative emissions system when a pressure difference between atmospheric pressure and an evaporative emissions system pressure (e.g., pressure within the evaporative emissions system at a location of a pressure sensor) is less than a predetermined pressure (e.g., −6 inches of water) during the third phase of the evaporative emissions system diagnostic sequence.

At 1090, method 1000 indicates that the evaporative emissions system is operating as may be expected via a human/machine interface and exits.

At 1026, method 1000 may reinitiate the present evaporative emissions system diagnostic. Method 1000 may also indicate that the present evaporative emissions system diagnostic sequence has not executed as may be expected. Method 1000 proceeds to exit.

In this way, method 1000 may perform a diagnostic of components of an evaporative emissions system including but not constrained to conduits or pipes between various components, canister vent valves, canister purge valves, and a fuel tank. Method 1000 executes in a sequence that allows method 1000 diagnose individual components of the evaporative emissions system.

Thus, the method of FIGS. 10 and 11 provides for a method for a method for operating an evaporative emissions system of a vehicle, comprising: operating a canister purge valve and two canister vent valves that are arranged in parallel during a diagnostic sequence to diagnose the two canister vent valves and two canister vent lines that couple the two canister vent valves; and generating an indication of evaporative emissions degradation in response to output of a pressure sensor generated during the sequence. In a first example, the method includes where the two canister vent valves are coupled to an exit vent line. In a second example that may include the first example, the method includes where a first of the two canister vent valves is coupled to a first carbon filled fuel vapor storage canister, and where a second of the two canister vent valves is coupled to a second carbon filled fuel vapor storage canister. In a third example that may include one or both of the first and second examples, the method includes where the operating includes commanding fully opening and fully closing the canister purge valve and the two canister vent valves. In a fourth example that may include one or more of the first through third examples, the method further comprises operating the canister purge valve and the two canister vent valves in a plurality of diagnostic sequence phases, where the duration of each of the plurality of diagnostic sequence phases is time based. In a fifth example that may include one or more of the first through fourth examples, the method further comprises monitoring output of the pressure sensor during each of plurality of diagnostic sequence phases. In a sixth example that may include one or more of the first through fifth examples, the method further comprises comparing pressures determined from the output of the pressure sensor to predetermined pressures in each of the plurality of diagnostic sequence phases. In a seventh example that may include one or more of the first through sixth examples, the method includes where the output of the pressure sensor is compared to a plurality of pressure ranges during a second phase of the plurality of diagnostic sequence phases.

The method of FIGS. 10 and 11 also provides for a method for a method for operating an evaporative emissions system of a vehicle, comprising: commanding open a first canister vent valve, a second canister vent valve, and a canister purge valve during an initial phase of an evaporative emissions system diagnostic, where the first canister vent valve is arranged in parallel with the second canister vent valve; commanding closed the second canister vent valve, commanding open the first canister vent valve and the canister purge valve during a first phase of an evaporative emissions system diagnostic; commanding closed the first canister vent valve, commanding open the second canister vent valve and the canister purge valve during a second phase of an evaporative emissions system diagnostic; and commanding closed the first canister vent valve and the second canister vent valve, and commanding open the canister purge valve during a third phase of an evaporative emissions system diagnostic. In a first example, the method further comprises generating an indication of evaporative emissions degradation in response to output of a pressure sensor not being within a threshold range during the initial phase of the evaporative emissions system diagnostic. In a second example that may include the first example, the method further comprises generating an indication of evaporative emissions degradation in response to output of the pressure sensor not being within a second threshold range during the first phase of the evaporative emissions system diagnostic. In a third example that may include one or both of the first and second examples, the method further comprises generating an indication of evaporative emissions degradation in response to output of the pressure sensor not being within a third threshold range during the second phase of the evaporative emissions system diagnostic. In a fourth example that may include one or more of the first through third examples, the method further comprises generating an indication of evaporative emissions degradation in response to output of the pressure sensor not being within a fourth threshold range during the third phase of the evaporative emissions system diagnostic.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and nonobvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an evaporative emissions system of a vehicle, comprising:

commanding open a first canister vent valve, a second canister vent valve, and a canister purge valve during an initial phase of an evaporative emissions system diagnostic, where the first canister vent valve is arranged in parallel with the second canister vent valve;

commanding closed the second canister vent valve, commanding open the first canister vent valve and the canister purge valve during a first phase of the evaporative emissions system diagnostic;

commanding closed the first canister vent valve, commanding open the second canister vent valve and the canister purge valve during a second phase of the evaporative emissions system diagnostic; and commanding closed the first canister vent valve and the second canister vent valve, and commanding open the canister purge valve during a third phase of the evaporative emissions system diagnostic.

2. The method of claim 1, further comprising generating an indication of evaporative emissions degradation in response to output of a pressure sensor not being within a threshold range during the initial phase of the evaporative emissions system diagnostic.

3. The method of claim 2, further comprising generating a second indication of evaporative emissions degradation in response to output of the pressure sensor not being within a second threshold range during the first phase of the evaporative emissions system diagnostic.

4. The method of claim 3, further comprising generating a third indication of evaporative emissions degradation in response to output of the pressure sensor not being within a third threshold range during the second phase of the evaporative emissions system diagnostic.

5. The method of claim 4, further comprising generating a fourth indication of evaporative emissions degradation in response to output of the pressure sensor not being within a fourth threshold range during the third phase of the evaporative emissions system diagnostic.

* * * * *